United States Patent
Lin et al.

(10) Patent No.: US 7,269,211 B2
(45) Date of Patent: Sep. 11, 2007

(54) RESIDUAL ECHO REDUCTION FOR A FULL DUPLEX TRANSCEIVER

(75) Inventors: Chia-Liang Lin, Union City, CA (US); Wen-Juh Kang, Tainan County (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 11/425,712

(22) Filed: Jun. 22, 2006

(65) Prior Publication Data
US 2007/0009017 A1 Jan. 11, 2007

Related U.S. Application Data

(63) Continuation of application No. 10/328,532, filed on Dec. 24, 2002, now Pat. No. 7,082,157.

(51) Int. Cl.
*H04B 1/38* (2006.01)
*H04B 3/20* (2006.01)
*H04M 9/08* (2006.01)

(52) U.S. Cl. .......................... 375/222; 370/286; 379/3; 379/406.05

(58) Field of Classification Search ............. 375/219, 375/223, 286, 288; 370/276–292
See application file for complete search history.

(56) References Cited

U.S. PATENT DOCUMENTS

| 5,596,604 | A | * | 1/1997 | Cioffi et al. | 375/260 |
| 5,712,848 | A | * | 1/1998 | Deutsch | 370/280 |
| 5,787,113 | A | * | 7/1998 | Chow et al. | 375/219 |

* cited by examiner

*Primary Examiner*—Don N. Vo
(74) *Attorney, Agent, or Firm*—Winston Hsu

(57) ABSTRACT

A hybrid circuit within a full-duplex transceiver transmits an outgoing signal outward on a communication channel at the same time it receives an incoming signal arriving via the communication channel, and the outgoing and incoming signals sum to form a combined signal. The hybrid circuit generates both the outgoing signal and a replica of the outgoing signal in response to an input signal, and then subtracts the replica from the combined signal in producing a received signal. The received signal includes a component derived from the incoming signal and a residual echo component having peaks resulting from a phase difference between the outgoing signal and its replica. The transceiver adjustably delays the input signal so that the residual echo component peaks occur at times other then when the received signal is being digitized, thereby minimizing the influence of the echo component peaks on the data sequence.

24 Claims, 8 Drawing Sheets

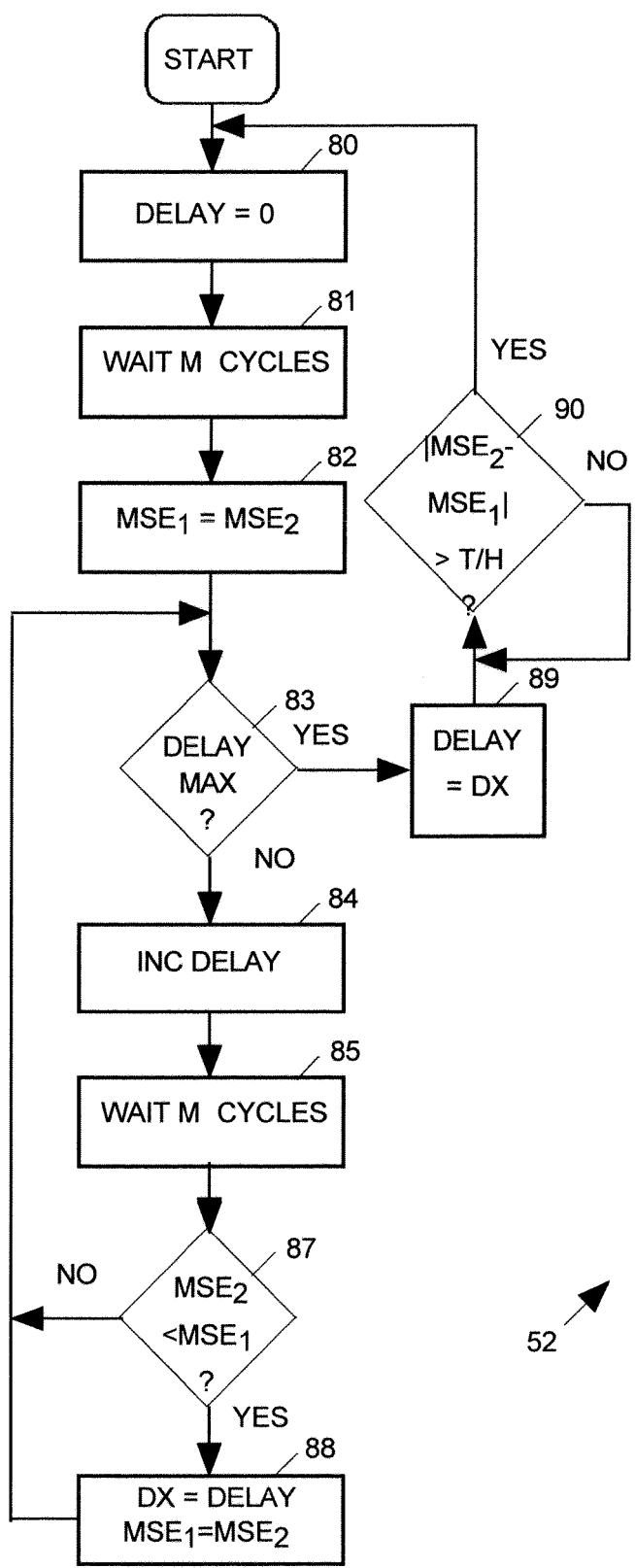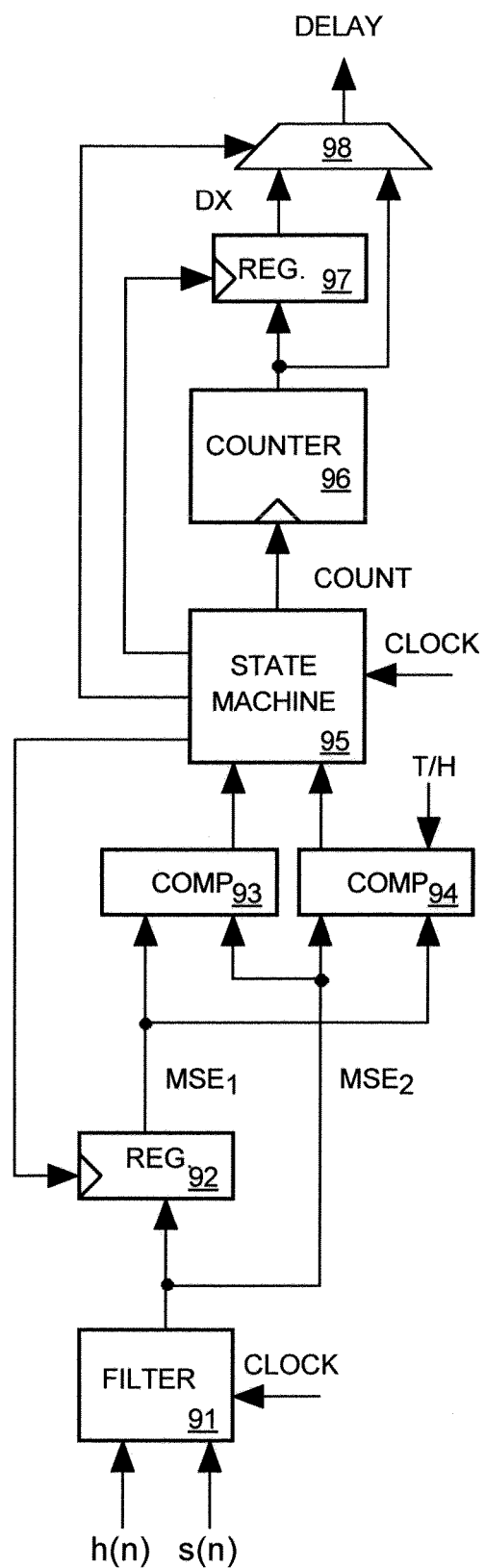
FIG. 8
FIG. 9

RESIDUAL ECHO REDUCTION FOR A FULL DUPLEX TRANSCEIVER

BACKGROUND OF THE INVENTION

1. Field of the Invention

The present invention relates in general to a transceiver for concurrently transmitting and receiving signals representing data sequences via the same communication channel, and in particular to a system for reducing effects of a residual echo of the transceiver's transmitted signal within the transceiver's received signal on data sequences the transceiver derives by processing its incoming signal.

2. Description of Related Art

FIG. 1 illustrates a conventional full duplex transceiver 10 for concurrently transmitting and receiving data via analog signals over the same bi-directional transmission line or other type of channel 12. Transceiver 10 converts an input data sequence tx(n) into an outgoing analog signal z(t) transmitted to a remote transceiver (not shown) via channel 12, and processes an analog incoming signal y(t) arriving on channel 12 from the remote transceiver to produce an output data sequence rx(n) matching a data sequence incoming signal y(t) represents.

Transceiver 10 includes an encoder 14 for encoding input data sequence tx(n) into another digital data sequence x(n) indicating the time-varying behavior outgoing signal z(t) must exhibit to represent sequence x(n). A digital-to-analog converter (DAC) 16 converts data sequence x(n) into an analog signal x(t), a line driver 18 amplifies the x(t) signal to produce a signal $r_0(t)$, and a hybrid circuit 20 for transmits the outgoing z(t) signal on channel 12 in response to the $r_0(t)$ signal.

Hybrid circuit 20 also generates an analog output signal r(t). A variable gain amplifier 21 amplifies the r(t) signal to produce an analog signal r'(t), a low-pass filter (LPF) 22 filters r'(t) to produce an analog "received" signal p(t), and an analog-to-digital converter 24 digitizes the p(t) signal to generate a digital waveform data sequence u(n) representing the behavior of the incoming signal y(t). A summer 26 subtracts a sequence v(n) produced by a digital echo cancellation circuit 27 from the u(n) sequence to produce a sequence w(n) supplied to an equalizer 28, which processes the w(n) sequence to generate a "soft decision" sequence s(n). Data elements of soft decision sequence s(n) represent approximately the same values as corresponding elements of the remote transceiver's x(n) sequence controlling behavior of incoming signal y(t) but with higher resolution. A slicer 30 reduces the resolution of soft decision sequence s(n) to produce a hard decision sequence h(n) matching the remote transceiver's x(n) sequence. A decoder 32 decodes hard decision sequence h(n) to produce the transceiver's output data sequence rx(n) which matches the remote transceiver's input tx(n) sequence.

Outgoing signal z(t) represents data sequences by periodically transitioning between a set of discrete voltage levels in an order controlled by the local transceiver's x(n) sequence. Since incoming signal y(t) is the remote transceiver's outgoing signal, it will also nominally transition between the same set of discrete voltage levels in an order specified by the remote transceiver's x(n) sequence. Since channel 12 attenuates incoming signal y(n), an automatic gain control circuit 31 monitors the u(n) sequence output of ADC 24 and adjusts the gain of amplifier 21 to compensate for the attenuation of the incoming signal. A timing recovery circuit 32 monitors soft and hard decision sequences s(n) and h(n) to determine how to control the phase and frequency of the ADC's sampling clock (CLOCK) so that ADC 24 periodically digitizes the p(t) signal at the appropriate times between its level transitions. Equalizer 28, suitably implemented by a finite impulse response filter, adjusts soft decision s(n) to compensate for inter symbol interference (ISI) distortion in the y(t) signal. An equalization adaptation circuit 34 monitors sequences h(n), s(n) and w(n) to determine how to adjust filter coefficients controlling equalizer 28 so that the equalizer correctly compensates for ISI distortion.

FIG. 2 illustrates line driver 18 and hybrid circuit 20 of FIG. 1 in more detailed block diagram form. Line driver 18 amplifies x(t) to produce the analog signal $r_0(t)$ and hybrid circuit 20 couples the $r_0(t)$ signal to channel 12 through a resistor R1 to produce outgoing signal z(t). Resistors R2 and R3 couple the inverting input of summing amplifier 40 between the output of line driver 18 and ground to produce a signal $r_2(t)$ at the inverting input that is a replica of outgoing signal z(t). Channel 12 is also connected to a non-inverting input of a summing amplifier 40 which generates the r(t) signal supplied to amplifier 21 of FIG. 1. A combined signal $r_1(t)$ appearing at the non-inverting input of summing amplifier 40 is of magnitude equal to the sum of magnitudes of outgoing signal z(t) and incoming signal y(t), $$r_1(t) = z(t) + y(t)$$

Ideally the replica signal $r_2(t)$ appearing at the inverting input of summing amplifier 40 will match the z(t) component of the $r_1(t)$ signal in both phase and amplitude so that when amplifier 40 offsets $r_1(t)$ with $r_2(t)$, summing amplifier 40 will remove all of the echo of both the outgoing signal z(t) and its replica $r_2(t)$ from the hybrid circuit's output signal r(t) so that r(t) will be an accurate representation of incoming signal y(t). Accordingly, when $$r_2(t) = z(t) \text{ and } r_1(t) = z(t) + y(t)$$

then $$r(t) = r_1(t) - r_2(t)$$
$$= [z(t) + y(t)] - z(t)$$
$$= y(t).$$

Thus hybrid circuit 20 ideally cancels z(t) from r(t) to produce a received signal r(t) matching incoming signal y(t). However since the replica signal $r_2(t)$ will never exactly match the z(t) component of $r_1(t)$ either in amplitude or in phase, it will not entirely cancel the effects of outgoing signal z(t) on received signal r(t). Some amount of residual echo of outgoing signal z(t) will therefore appear as a component of the hybrid circuit's output signal r(t) and can affect the digital waveform data sequence u(n) output of ADC 24 of FIG. 1.

Digital echo cancellation circuit 27 of FIG. 1 processes the x(n) sequence controlling the z(t) sequence to generate a sequence v(n) approximating the residual echo appearing in the u(n) sequence so that when summer 26 subtracts the v(n) sequence from the u(n) sequence, it removes much of the residual echo from the resulting w(n) sequence. An adaptation circuit 36 monitors hard and soft decision sequences h(n) and s(n) to determine how to adjust filter coefficients controlling the manner in which echo cancellation circuit 27 estimates the residual echo.

While echo cancellation circuit 27 is able to adequately compensate for small amounts of residual echo in the u(n) sequence arising from differences in amplitude of outgoing signal z(t) and its replica signal $r_2(t)$, it is less adept at compensating for residual echo peaks in the u(n) sequence arising from phase differences between the z(t) and $r_2(t)$ signals. Phase differences between the z(t) component of $r_1(t)$ and its replica $r_2(t)$ arise due to differences in signal path delays from the output of line driver 18 to the inverting and non-inverting inputs of summing amplifier 40. The path delays are functions of path length and impedances and it is difficult to precisely match the delays of the two signal paths, particularly in high frequency applications where small differences in path impedances can result in relatively large phase differences.

FIG. 3 is a timing diagram illustrating an example of the manner in which various signals of FIGS. 1 and 2 may behave. Clock signals controlling operations of the local and remote transceivers are synchronized to the extent that level transitions in the x(t) and y(t) signal components of the $r_1(t)$ signal and the level transitions in replica signal $r_2(t)$ all occur with the same frequency, but they do not necessarily occur at the same time when viewed at the inputs of summing amplifier 40. In the example illustrated in FIG. 3, the $r_2(t)$ and z(t) signal components $r_1(t)$ have the same magnitude but differ in phase. The magnitude difference between $r_2(t)$ and z(t) peaks during times when $r_2(t)$ and z(t) transition and those peaks appear as residual echo components of the r(t) signal input to amplifier 21 of FIG. 1.

The "received" signal p(t) supplied as input to ADC 24 of FIG. 1 is an amplified and filtered version of r(t) and ideally should have an amplitude proportional to y(t). Timing recovery circuit 32 of FIG. 1 adjusts the phase and frequency of the CLOCK signal input to ADC 24 so that the ADC samples p(t) between its transitions. In this particular example, the residual noise peaks in p(t) resulting from the phase difference in between the $r_2(t)$ and z(t) signals happen to occur when received signal p(t) is being sampled, and in such case the residual noise due to the phase difference between $r_2(t)$ and z(t) has a substantial effect on the value of the u(n) sequence output of ADC 24.

It is possible to reduce the residual echo peaks by reducing differences in path delays between the output of driver 18 and the inverting and non-inverting inputs of summing amplifier 40 so as to reduce the phase difference between $r_2(t)$ and z(t). But adjusting signal paths delays to substantially eliminate such phase differences can be difficult, particularly in high frequency applications where very small differences in signal path lengths or impedances can substantially affect phase differences between the $r_2(t)$ and z(t) signals. Therefore what is needed is a way to reduce the effect on the output u(n) sequence of ADC 24 of residual echo peaks in the r(t) signal arising from a phase mismatch between the z(t) component of $r_1(t)$ and replica signal $r_2(t)$.

BRIEF SUMMARY OF THE INVENTION

A hybrid circuit within a full-duplex transceiver transmits an outgoing signal outward via a communication channel at the same time it receives an incoming signal arriving via the communication channel, and the outgoing and incoming signals sum within the hybrid circuit to form a combined signal. The hybrid circuit generates both the outgoing signal and a replica of the outgoing signal in response to an input signal, and subtracts the replica from the combined signal as it produces a received signal including a component derived from the incoming signal and a residual echo component having peaks resulting from a phase difference between the outgoing signal and its replica. The transceiver periodically digitizes the received signal to generate a waveform data sequence representing the incoming signal, and then processes the waveform data sequence to produce soft and hard decision data sequences representing a data sequence also represented by the incoming signal.

In accordance with one aspect of the invention, the transceiver adjustably delays the hybrid circuit's input signal so that the residual echo component peaks in the received signal occur in the received signal at times other than when the transceiver is digitizing the received signal, thereby minimizing the influence of the residual echo component peaks on the waveform data sequence.

In accordance with another aspect of the invention, the transceiver experimentally determines an appropriate amount of input signal delay by adjusting the delay so as to minimize a difference between the hard and soft decision sequences, such as for example, a root mean square difference between corresponding elements of the hard and soft decision sequences.

The claims appended to this specification particularly point out and distinctly claim the subject matter of the invention. However those skilled in the art will best understand both the organization and method of operation of what the applicant (s) consider to be the best mode(s) of practicing the invention, together with further advantages and objects of the invention, by reading the remaining portions of the specification in view of the accompanying drawing(s) wherein like reference characters refer to like elements.

BRIEF DESCRIPTION OF THE DRAWINGS

FIG. 8 is a flow chart illustrating actions carried out by the state machine of FIG. 9;

FIG. 9 illustrates a second example of the delay adjustment circuit of FIG. 4 in block diagram form;

DETAILED DESCRIPTION OF THE INVENTION

The present invention relates in general to a full-duplex transceiver for concurrently transmitting and receiving signals representing data sequences via the same channel, and in particular to a system for reducing effects of a residual echo of a transceiver's transmitted signal within the transceiver's received signal on data sequences the transceiver derives from the received signal. While the specification below describes exemplary embodiments of the invention considered to be best modes of practicing the invention, other modes of practicing the invention are possible.

Figure 1:
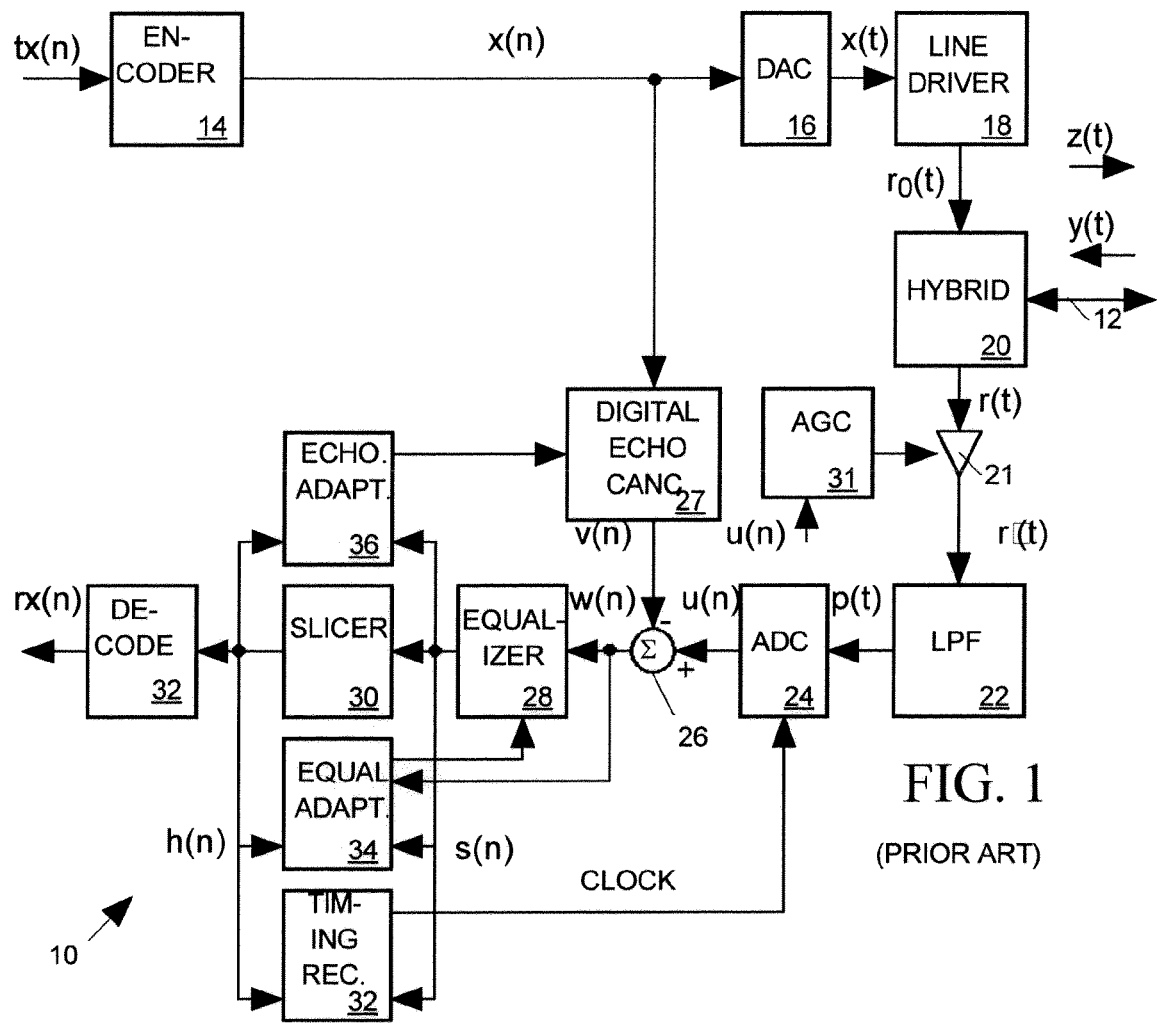
FIG. 1 depicts a prior art full-duplex transceiver in block diagram form.
Figure 4:
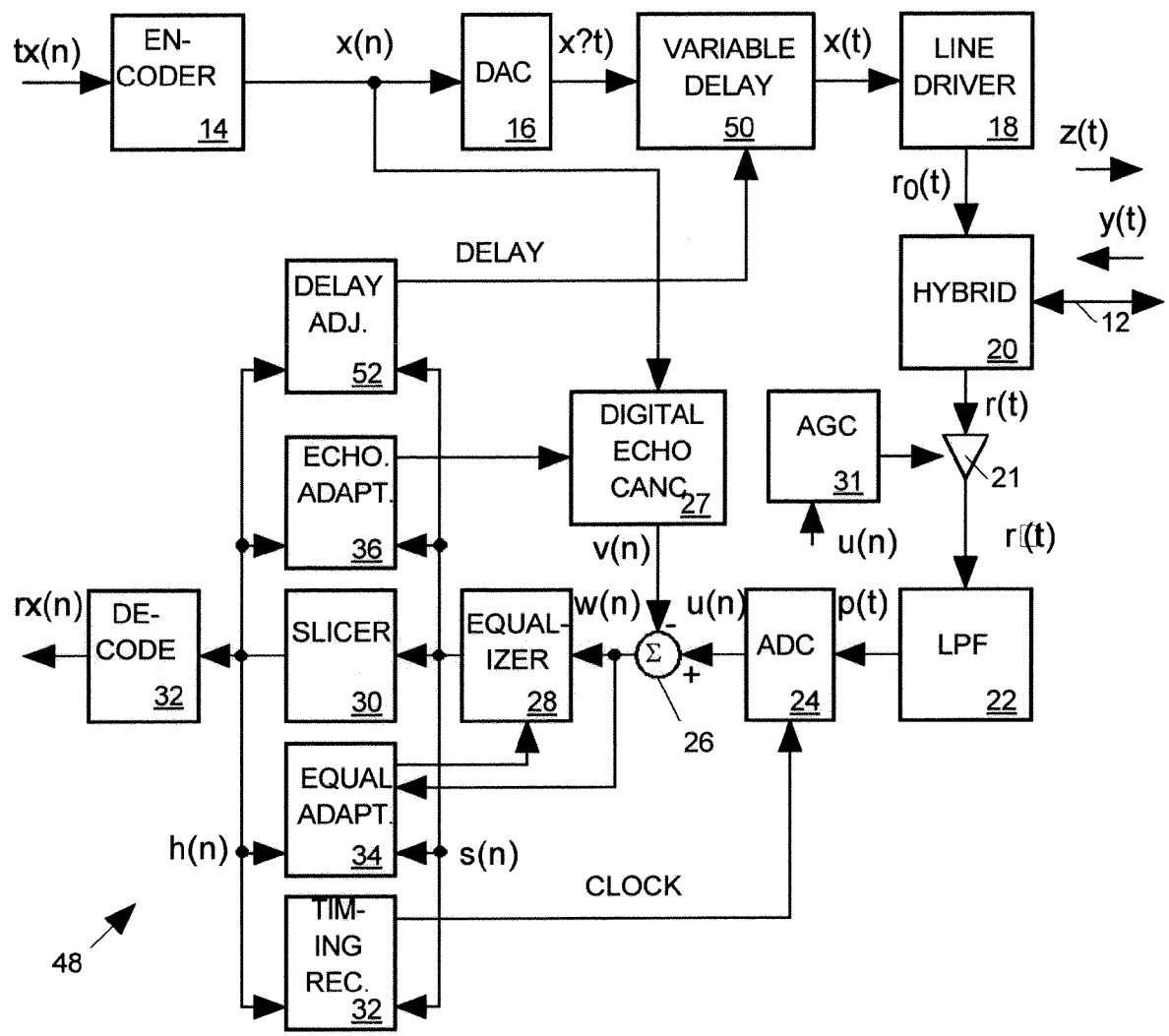
FIG. 4 depicts a full-duplex transceiver in accordance with the invention in block diagram form.

FIG. 4 illustrates an example full-duplex transceiver 48 in accordance with the invention which can be considered an improvement to the prior art full duplex transceiver 10 of FIG. 1. (Similar components of the receivers 10 and 48 are designated by similar reference characters.) Transceiver 48 converts an input data sequence tx(n) into an outgoing analog signal z(t) sent to a remote transceiver (not shown) via a transmission line or any other kind of communication channel 12, and processes an analog incoming signal y(t) to reproduce a data sequence rx(n) that incoming signal y(t) represents.

Transceiver 48 includes an encoder 14 for encoding input data sequence tx(n) into another digital data sequence x(n) that is a digital representation of the time-varying behavior outgoing signal z(t). A digital-to-analog converter (DAC) 16 converts data sequence x(n) into a time-varying analog signal x'(t), a variable delay circuit 50 adjustably delays the x'(t) signal to produce a signal x(t), a line driver 18 amplifies signal x(t) to produce a signal $r_0(t)$, and a hybrid circuit 20 produces the outgoing z(t) signal on channel 12 in response to the $r_0(t)$ signal.

Hybrid circuit 20 also generates an analog output signal r(t) in response to the incoming y(t) signal. A variable gain amplifier 21 amplifies output signal r(t) to produce a signal r'(t), a low-pass filter (LPF) 22 filters signal r'(t) to produce an analog "received" signal p(t), and an analog-to-digital converter 24 digitizes received signal p(t) to generate a digital waveform data sequence u(n) representing incoming signal y(t). A summer 26 subtracts a sequence v(n) produced by a digital echo cancellation circuit 27 from the u(n) sequence to produce a sequence w(n) supplied to an equalizer 28 which processes the w(n) sequence to generate a "soft decision" sequence s(n). Data elements of soft decision sequence s(n) represent approximately the same values as corresponding elements of the remote transceiver's x(n) sequence but do so with higher resolution by using more bits to represent the same quantities. A slicer 30 rounds off the quantity by each soft decision sequence elements s(n) to produce a corresponding "hard decision" sequence h(n) having fewer bits. Each element of hard decision sequence h(n) matches in both magnitude and number of bits, a corresponding element of the remote transceiver's x(n) sequence. A decoder 32 decodes hard decision sequence h(n) to produce the transceiver's output data sequence rx(n) matching the remote transceiver's input tx(n) sequence.

The analog outgoing signal z(t) represents data sequences by periodically transitioning between a limited set of discrete voltage levels selected by the x(n) sequence. Since the incoming y(t) signal is the remote transceiver's outgoing signal, it will also nominally transition between the same limited set of discrete voltage levels in an order specified by the remote transceiver's x(n) sequence. An automatic gain control circuit 31 monitors the u(n) sequence output of ADC 24 and adjusts the gain of amplifier 21 to compensate for any attenuation of the y(t) signal. A timing recovery circuit 32 monitors soft and hard decision sequences s(n) and h(n) to determine how to control the phase and frequency of the ADC's sampling clock (CLOCK) so that ADC 24 periodically digitizes the p(t) signal at appropriate times between its level transitions. In producing soft decision sequence s(n) equalizer 28 compensates for inter symbol interference (ISI) distortion in the y(t) signal. An equalization adaptation circuit 34 processes sequences h(n), s(n) and w(n) to determine how to adjust filter coefficients controlling equalizer 28 so that it correctly compensates for ISI distortion. As discussed in more detail below, a delay adjustment circuit 52 in accordance with the invention monitors hard and soft decision sequences h(n) and s(n) to determine how to adjust a delay control signal (DELAY) controlling the delay of variable delay circuit 50. The DELAY signal may be either an analog or digital signal having a magnitude indicating a particular delay circuit 50 is to provide.

Figure 2:
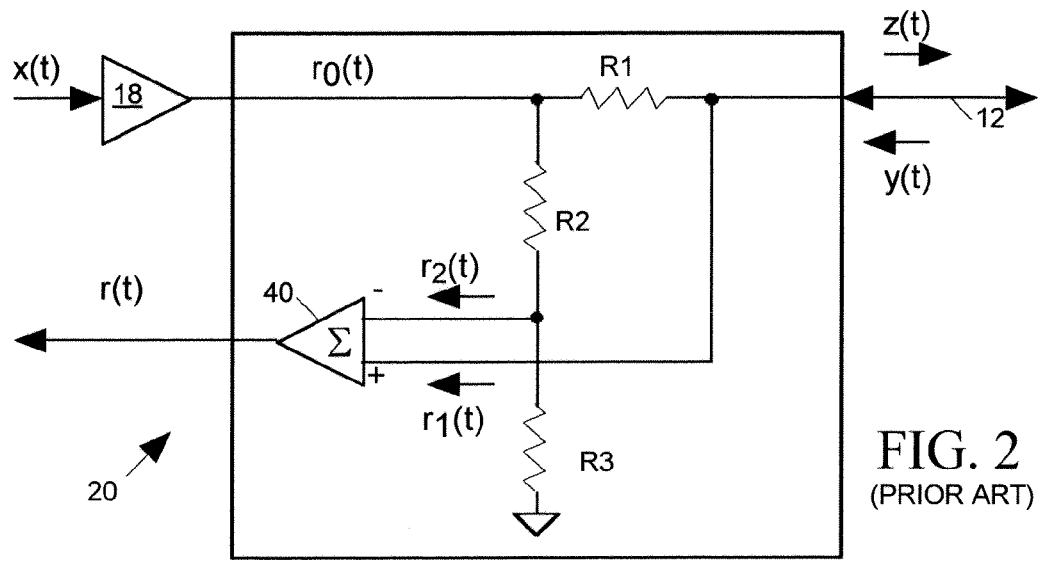
FIG. 2 depicts the hybrid circuit of FIGS. 1 and 4 in more detailed block and schematic diagram form.
Figure 3:
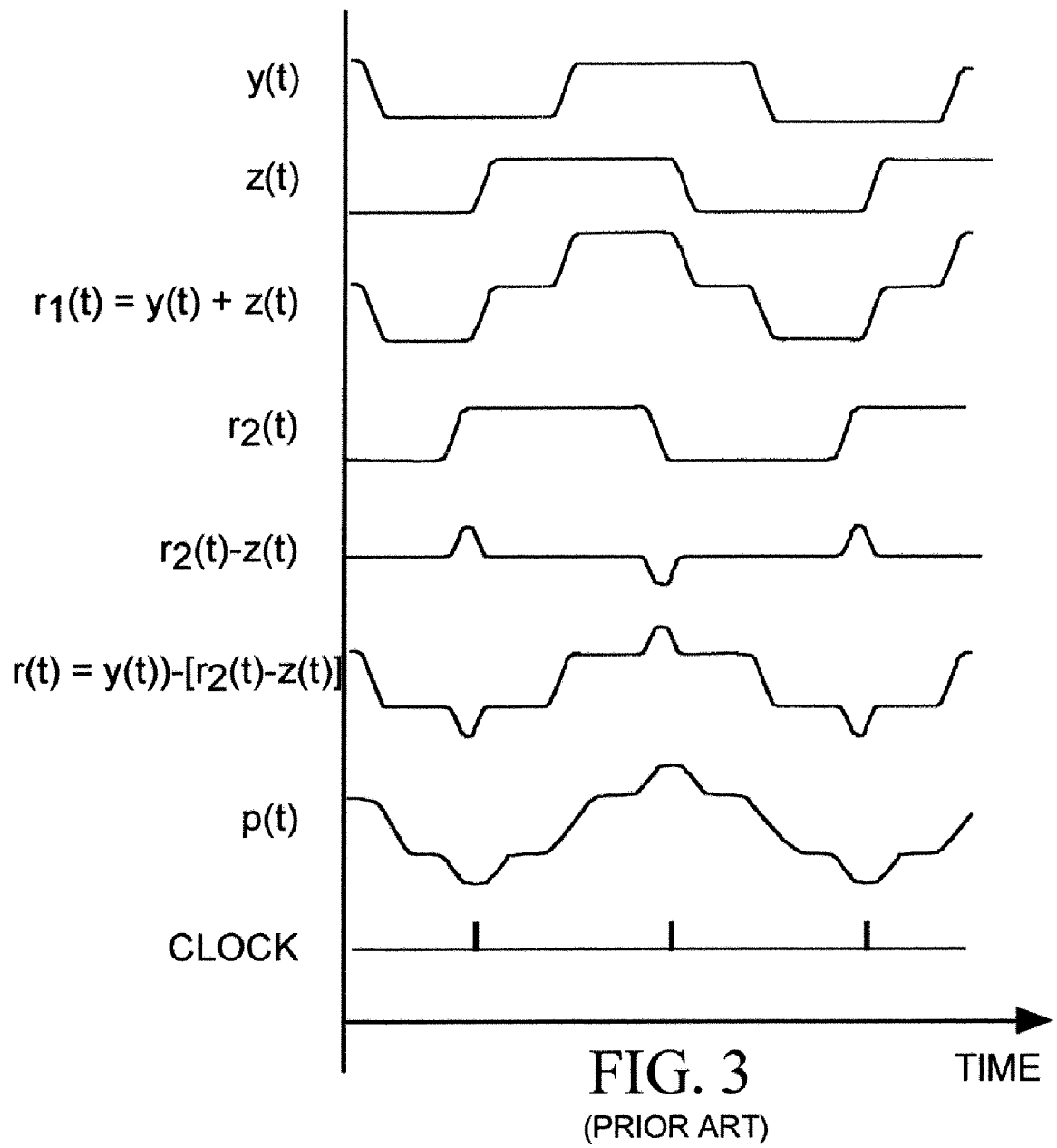
FIG. 3 is a timing diagram depicting timing relationships between signals of the circuits of FIGS. 1 and 2.

FIG. 2 illustrates line driver 18 and hybrid circuit 20 of transceiver 48 of FIG. 4 in more detail. Hybrid circuit 20 couples the $r_0(t)$ signal to channel 12 through a resistor R1 to produce the outgoing z(t) signal. Resistors R2 and R3 couple the inverting input of a summing amplifier 40 between the output of line driver 18 and ground to provide a signal $r_2(t)$ at the inverting input of amplifier 40 that is a replica of outgoing signal z(t). Channel 12 is linked to a non-inverting input of a summing amplifier 40 which generates the r(t) signal supplied to amplifier 21 of FIG. 1. The time-varying magnitude of a signal $r_1(t)$ appearing at the non-inverting input of summing amplifier 40 is equal to the sum of time varying magnitudes of outgoing signal z(t) and incoming signal y(t).

$$r_1(t)=z(t)+y(t)$$

Ideally the $r_2(t)$ signal appearing at the inverting input of summing amplifier 40 will match the z(t) component of the $r_1(t)$ in both phase and amplitude. In such case summing amplifier 40 will cancel all of the echo of the outgoing z(t) signal from the signal r(t) supplied to amplifier 21 of FIG. 1 so that r(t)=y(t). However normally $r_2(t)$ will not exactly match z(t) either in amplitude or in phase, and some amount of residual echo of the z(t) signal will appear as a component of the hybrid circuit's output signal r(t) and in its received signal p(t) of FIG. 4.

Digital echo cancellation circuit 27 of FIG. 4 processes the x(n) sequence controlling the z(t) sequence to generate a sequence v(n) that is an estimate of the of residual echo appearing in data sequence u(n) so that when summer 26 subtracts the v(n) sequence from the u(n) sequence, much of the residual echo of the z(t) signal is removed from the resulting w(n) sequence. An adaptation circuit 36 monitors hard and soft decision sequences h(n) and s(n) to determine how to adjust filter coefficients employed by digital echo cancellation circuit 27 so that the v(n) sequence best approximates the residual echo in the u(n) sequence. As described below, the invention reduces the amount of residual echo appearing in the u(n) sequence so that digital echo cancellation circuit 27 need cancel only a relatively smaller amount of echo, and errors in the v(n) sequence it produces have less impact on the w(n) sequence.

As may be seen by comparing FIGS. 1 and 4, prior art transceiver 10 and transceiver 48 differ in that in transceiver 48 includes a variable delay circuit 50 between DAC 16 and line driver 18 and a delay adjustment circuit 52 for controlling the delay of variable delay circuit 50. Variable delay circuit 50 does not eliminate or even reduce the residual echo in received signal p(t) due to the phase difference between $r_2(t)$ and z(t), but it does affect the phase of periodic residual echo peaks in received signal p(t) relative to the CLOCK signal input to ADC 24 in a way that substantially reduces or eliminates the effects of such residual echo peaks in the waveform data sequence u(n) produced when ADC 24 digitizes p(t).

Figure 5:
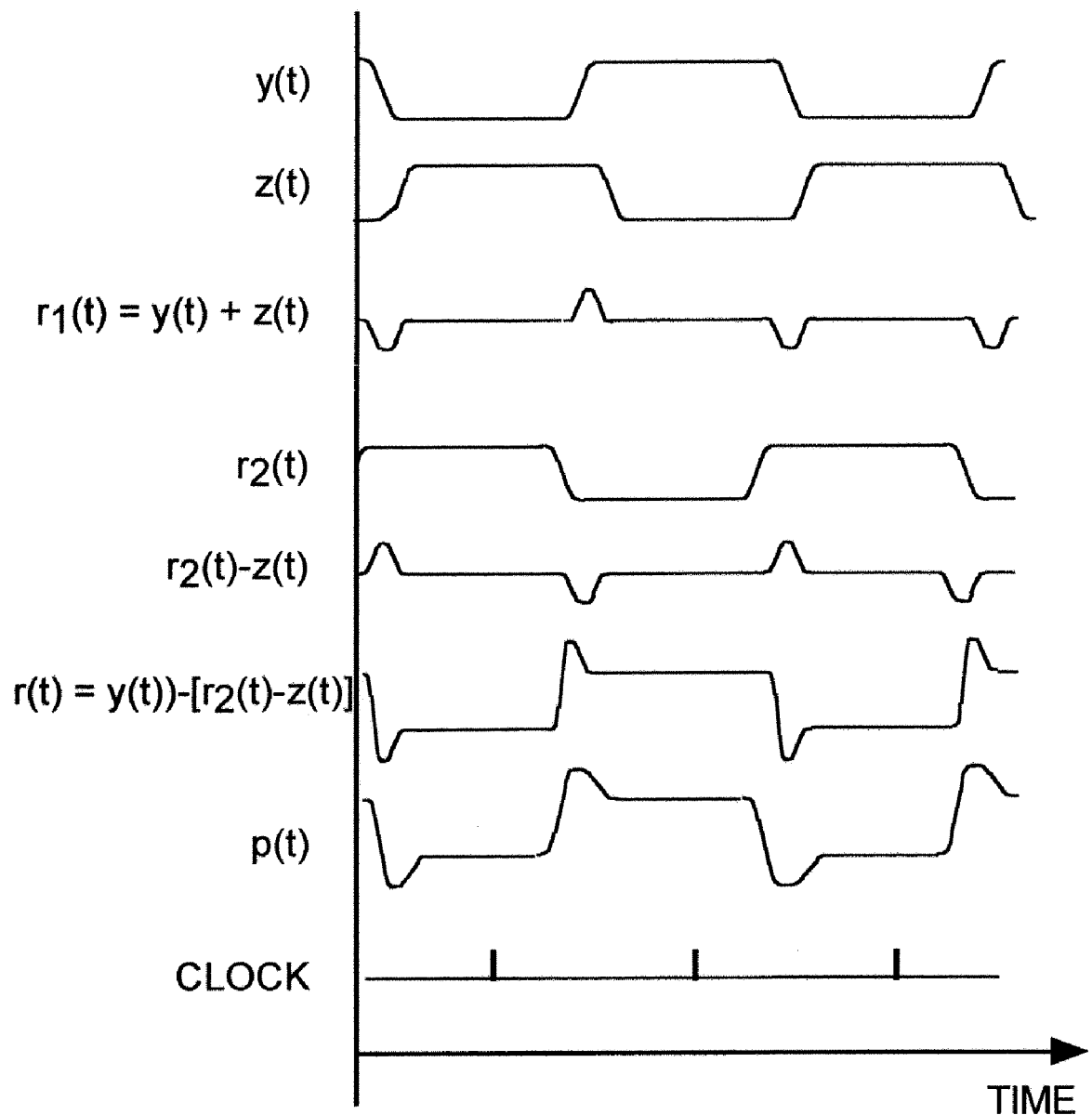
FIG. 5 is a timing diagram depicting timing relationships between signals of the circuits of FIGS. 4 and 2.

FIG. 5 is a timing diagram illustrating an example behavior of various signals of FIGS. 2 and 4. Clock signals controlling operations of the local and remote transceivers are matched to the extent that level transitions in incoming and the outgoing signals y(t) and z(t) occur with substantially the same frequency but they do not necessarily occur at the same time when viewed as components of the $r_1(t)$ signal at the non-inverting input of summing amplifier 40. In the example of FIG. 4, the $r_2(t)$ signal and z(t) signal component of $r_1(t)$ at the inputs of summing amplifier 40 have substantially similar magnitudes but differ in phase. Magnitude differences between $r_2(t)$ and z(t) peak during times when $r_2(t)$ and z(t) transition and since $$r(t)=y(t)-[r_2(t)-z(t)]$$

such residual echo peaks appear as components of the r(t) signal input to amplifier 21 of FIG. 4.

Since the received signal p(t) at the input of ADC 24 of FIG. 4 is an amplified and filtered version of r(t), residual echo peaks also occur in received signal p(t). To reduce or eliminate the effects of residual echo peaks on the data sequence u(n) that ADC 24 generates in response to received signal p(t), delay adjustment circuit 52 of FIG. 4 adjusts the delay of variable delay circuit 50 so that residual noise peaks due to phase differences between $r_2(t)$ and z(t) occur during (rather than between) level transitions in p(t) that result from level transitions in incoming signal y(t).

Note that since variable delay circuit 50 adjustably delays the x(t) input to line driver 18, it also adjustably delays the output signal $r_0(t)$ of line driver 18. Since z(t) and $r_2(t)$ are both derived from $r_0(t)$, variable delay circuit 50 adjustably delays both $r_2(t)$ and z(t) by the same amount relative to the y(t) signal component of the $r_1(t)$. Thus delay adjustment circuit 52 can freely adjust the timing of residual noise peaks $r_2(t)-z(t)$ so that they substantially coincide with transitions in y(t). Since residual noise peaks appear only during level transitions in received signal p(t) resulting from transitions in y(t), and since ADC 24 samples only between such level transitions, then ADC 24 does not sample the residual noise peaks when producing the u(n) sequence. Thus with the delay of variable delay circuit 50 properly adjusted, the effects on the output sequence u(n) of ADC 24 of the residual noise peaks in received signal p(t) are substantially reduced or eliminated.

When all control signals produced by adaptive control circuits 30, 32, 34, 36 and 52 of the FIG. 4 are properly set, corresponding $n^{th}$ elements of the hard and soft decision sequences will ideally be equal such that h(n)=s(n) for each value of n. Although soft decision sequence elements s(n) have more bits than their corresponding hard decision sequence elements h(n), the higher order bits of s(n) should ideally match h(n) and the lower order bits of s(n) should ideally all be 0. Assuming AGC 31 correctly adjusts the gain of amplifier 21, any difference between corresponding values of h(n) and s(n) indicates that at least one of adaptive control circuits is incorrectly adjusting its output. Each of these adaptive control circuits therefore implements a separate algorithm that looks for particular patterns in differences between corresponding elements of sequences h(n) and s(n) to determine how to adjust its own output control data or signal.

Accordingly, delay adjustment circuit 52 monitors soft and hard decision sequences s(n) and h(n) to determine how to adjust the delay of delay circuit 50. Since the difference between corresponding values of s(n) and h(n) tends to increase with the deviation of the delay of delay circuit 50 from its ideal setting, delay adjustment circuit 52 suitably searches for a delay setting that will minimize a measure the difference between corresponding elements hard and soft decision sequences h(n) and s(n). Many measures of such differences can be used. In the preferred embodiment of the invention delay adjustment circuit 52 searches for a delay that will minimize a mean square error (MSE) of elements of soft decision sequence s(n) with respect to corresponding elements of hard decision sequence h(n):

$$MSE = (1/K)\sum_{n=1}^{K} [h(n) - s(n)]^2$$

where K>1 is a number of corresponding pairs of h(n) and s(n) elements upon which the mean square error is based. Delay adjustment circuit 51 may alternatively employ other measures of the difference between h(n) and s(n) such as, for example, a sum of square errors (SSE), $$SSE = \sum_{n=1}^{K} [h(n) - s(n)]^2$$

a mean absolute error (MAE), $$MAE = (1/K)\sum_{n=1}^{K} |h(n) - s(n)|$$

or a sum of absolute errors (SAE), $$SAE = \sum_{n=1}^{K} |h(n) - s(n)|$$

Variable delay circuit 50 therefore suitably provides a delay that is adjustable in $2^N$ equal steps over a full period P of the clock signal. Thus a digital DELAY signal will provide N-bit control data or an analog DELAY signal that may be of any of $2^N$ different signal levels so that either type of DELAY signal may represent a value ranging between 0 and $2^N-1$ corresponding to a delay ranging from 0 to $(2^N-1)/2^N$. For example setting N=4 provides 16 different delay steps ranging between 0 and (15/16) P and such delay resolution will typically provide sufficient control over the delay of x(t).

Devices 50 and 18 together form a delay circuit 51 supplying signal $r_0(t)$ to hybrid circuit 20 with an adjustable delay controlled by delay control signal DELAY. Devices 20, 21, 22 and 32 together form a signal processing circuit 53 generating z(t), p(t), $r_1(t)$, $r_2(t)$ in response to $r_0(t)$. Devices 24, 26, 27, 28, 30, 34, 36 and 52 together form a signal processing circuit 55 generating soft decision sequence s(n), hard decision sequence h(n) and delay control signal DELAY. Devices 26, 27, 28, 34, and 36 together form a signal processing circuit 57 generating soft decision sequence s(n), and delay control signal DELAY.

Figure 6:
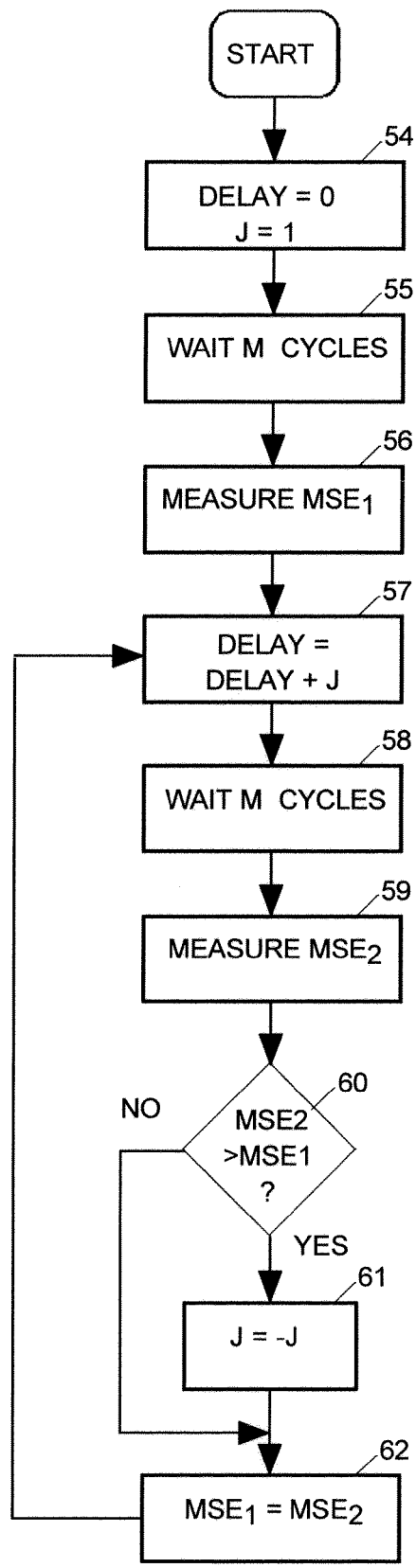
FIG. 6 is a flow chart illustrating actions carried out by the state machine of FIG. 7.

FIG. 6 illustrates an algorithm that delay adjustment circuit 52 may employ to adjust the DELAY signal based on the soft and hard decision sequence values s(n) and h(n). Circuit 52 initially (step 54) sets the magnitude of the DELAY signal to 0 on system startup so that variable delay circuit 50 delays provides minimum delay and also sets a parameter J equal to 1. After waiting a number M of cycles sufficient for the change in delay to affect soft and hard and decision sequence values s(t) and h(t) (step 55), circuit 52 measures (at step 56) a first mean square error (MSE₁) of soft decision sequence s(n) relative hard decision sequence h(n). MSE₁ is an average of squares of differences in values between a set of K>1 corresponding values of h(n) and s(n):

$$MSE_1 = (1/K) \sum_{n=1}^{K} [h(n) - s(n)]^2$$

Circuit 52 then (step 57) increments the value of the DELAY signal by the value of J (initially 1), waits another M cycles for the change in the DELAY signal value to be reflected in the h(n) and s(n) sequences (step 58), and then re-measures the mean square error of s(n) relative to h(n) to produce second means square error data $MSE_2$ (step 59). If the change in delay caused by incrementing the DELAY signal value by J=1 decreases the effects of residual echo on s(n), then $MSE_2$ will be less than $MSE_1$. Thus when $MSE_2$ is not greater than $MSE_1$ (step 60), circuit 52 determines that incrementing the DELAY signal value by J was helpful and, after replacing the stored value of $MSE_1$ with the value of $MSE_2$ (step 62), circuit 52 returns to step 57 to again increment the DELAY signal value by J. Waiting another M cycles (step 58), circuit 51 re-measures $MSE_2$ (step 59) and again compares $MSE_2$ and $MSE_1$ to determine whether incrementing the DELAY signal value by J further decreases the effects of residual echo on h(n).

Delay adjustment circuit 52 continues to loop through steps 57, 58, 59, 60 and 62 incrementing the DELAY signal value by J until at step 60 it discovers that $MSE_2 > MSE_1$. This indicates that the last increment to the DELAY signal value increased, rather than reduced, the effects of residual echo on h(n). In such case, delay adjustment circuit sets J equal to –J (step 61) so that J now becomes –1. Returning to step 57, the DELAY signal value is now decremented since J is negative 1 instead of a positive 1. Delay adjustment circuit 52 continues to loop through steps 57, 58, 59, 60 and 62 decrementing the DELAY signal value until at step 60 it discovers that $MSE_2$ is not greater than $MSE_1$. When the DELAY signal value reaches its appropriate value for which the residual noise peaks in analog signal p(t) occur during rather than between its level transitions and have little or no effect on digital samples u(n) of p(t) the DELAY signal value will begin to oscillate between that value and a next higher or lower value.

Figure 7:
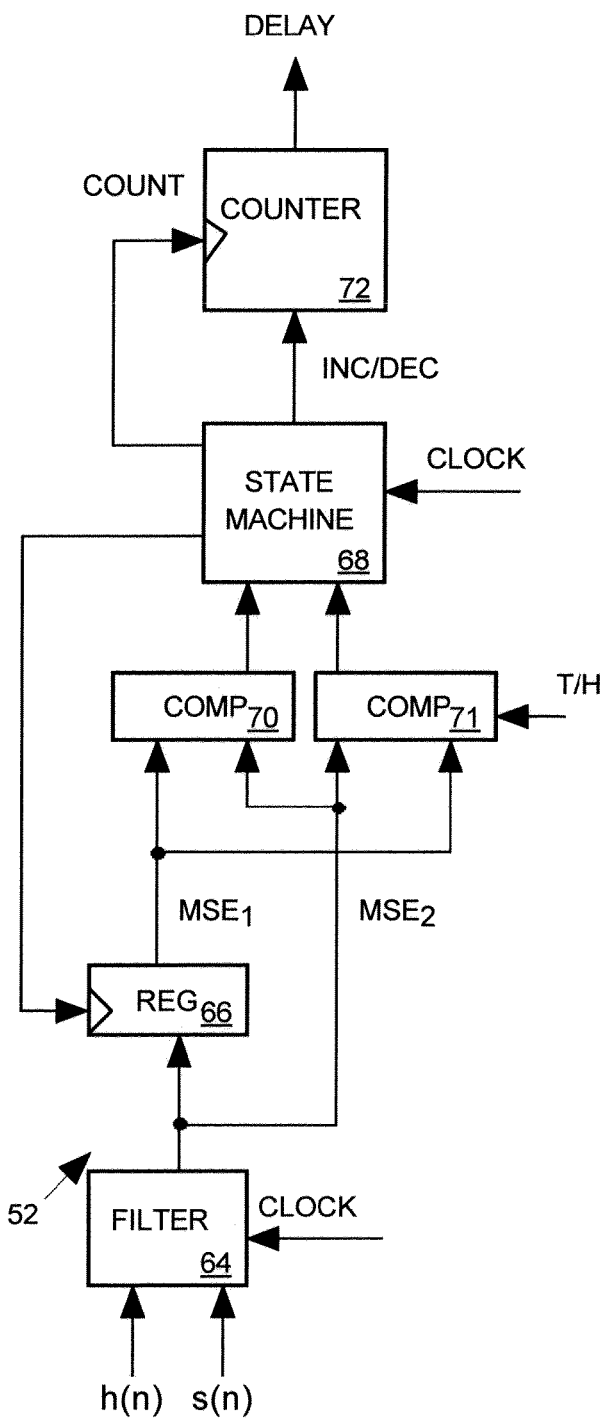
FIG. 7 depicts a first example of the delay adjustment circuit of FIG. 4 in block diagram form.

FIG. 7 is a block diagram illustrating an example architecture for delay adjusting circuit 52 of FIG. 4 suitable for implementing the algorithm of FIG. 6. A digital filter 64 processes soft and hard decision sequences s(n) and h(n) to produce the $MSE_2$ value, and a register 66 clocked by a state machine 68 saves a last generated $MSE_2$ value as the $MSE_1$ value. A comparator 70 compares $MSE_1$ and $MSE_2$ and supplies a signal to state machine 68 indicating results of the comparison. An up/down counter 72 clocked by state machine 68 generates digital DELAY control data for controlling the delay of variable delay circuit 50. On system start up or reset, counter 72 sets its DELAY output data to 0. State machine 68 waits for M CLOCK cycles until h(n) and s(n) reflect the residual echo associated with the current value of the DELAY control data, and then waits another K cycles for the output $MSE_2$ of filter 64 properly represents the means square error of s(n). State machine 68 then increments counter 72, loads $MSE_2$ into register 66 so that $MSE_1$ takes on the value of $MSE_2$, and then waits M cycles for the h(n) and s(n) sequences to begin to reflect the change in $MSE_2$ output of filter 64 to settle to a value appropriate for the new value of the DELAY control data. State machine 68 then signals counter 72 to either increment or decrement its count depending on the output of comparator 70 and on whether it last signaled counter 72 to increment or decrement the DELAY control data.

When the DELAY data reaches an optimal value for which $MSE_2$ is minimized, it oscillates would between that value and a next higher or lower DELAY data value if circuit 52 were to continue to test whether it should increment or decrement the DELAY data. But such oscillation in the DELAY data would produce jitter in the outgoing signal z(t) that could be problematic for the remote transceiver. Since the DELAY data need only be adjusted once following system start up after the CLOCK signal phase stabilizes, state machine 68 is suitably adapted to stop adjusting the DELAY data when the output of comparator 70 begins to change state after each $MSE_2$ measurement cycle, since this indicates that the DELAY data value has been optimized.

A shut down and restart of the remote transceiver or other event can cause a change in the phase of incoming signal y(t) requiring timing recovery circuit 32 of FIG. 4 to adaptively change the phase of the CLOCK signal. In such case the delay provided by delay circuit 50 may no longer be correct and delay adjustment circuit 52 should repeat the DELAY data adjustment process. Therefore when state machine 68 determines that the DELAY data has converged to an appropriate value and stops adjusting it, the state machine retains the current value of $MSE_1$ in register 61 and stops loading new values of $MSE_2$ produced by filter 64 into it after each measurement cycle. A comparison circuit 71 signals state machine 68 whenever an absolute difference between $MSE_1$ and $MSE_2$ reaches a threshold T/H because that indicates the CLOCK signal phase is likely to have changed. State machine 68 responds by resuming the DELAY adjustment process until the DELAY data value takes on a new value appropriate for the new CLOCK signal phase.

FIG. 8 illustrates an alternative DELAY adjustment algorithm that may be implemented by delay adjustment circuit 52 of FIG. 4 and FIG. 9 illustrates a suitable delay adjustment circuit architecture for implementing that algorithm. Referring to FIGS. 8 and 9, on system start up counter 93 sets its output count to 0 and state machine 95 switches multiplexer 98 to select that count as the output DELAY data, thereby setting DELAY to 0 (step 80). After waiting M cycles for the delay to affect the hard and soft decision data (step 81), state machine 95 signals a register 89 to load $MSE_2$ data currently generated by a filter 88, and that $MSE_2$ data becomes a first measured $MSE_1$ value (step 82). If DELAY is not at its maximum value (step 83) state machine 95 signals counter 96 to increment DELAY (step 84), waits M cycles (step 85) and then checks the output of a computer 93 to determine whether the current $MSE_2$ output of filter 91 is smaller than the $MSE_1$ stored in register 92 (step 87). If so, state machine 96 signals a register 97 to save the current value of DELAY as a variable DX and signals register 92 to replace the current value of $MSE_1$ with the current value of $MSE_2$ (step 88) Thereafter, or after step 87 if $MSE_2$ is not less than $MSE_1$, state machine 95 returns to step 83. State machine 95 continues to loop through steps 83-88 obtaining a value of $MSE_2$ for each possible value of DELAY until DELAY has reached its maximum value at step 83. At that point, the value of DELAY for which $MSE_2$ is minimized will be stored as variable DX in register 97 and the corresponding minimum value of $MSE_2$ will be stored in register 92 as $MSE_1$. State machine 95 then signals multiplexer 98 to choose the DX contents of register 97 as the output DELAY data (step 89).

State machine 95 thereafter retains the current values of DX and $MSE_1$ in register 97 and 92 and continues to signal multiplexer 98 to select DX as the output DELAY data. However FILTER 91 continues to compute $MSE_2$, and when a comparison circuit 94 signals state machine 95 that $MSE_1$ and $MSE_2$ differ by a minimum threshold amount (step 90), indicating that the CLOCK signal phase has likely changed and the DELAY data value may no longer be appropriate, state machine 95 returns to step 80 to begin searching for another more appropriate value for DELAY.

Figure 10:
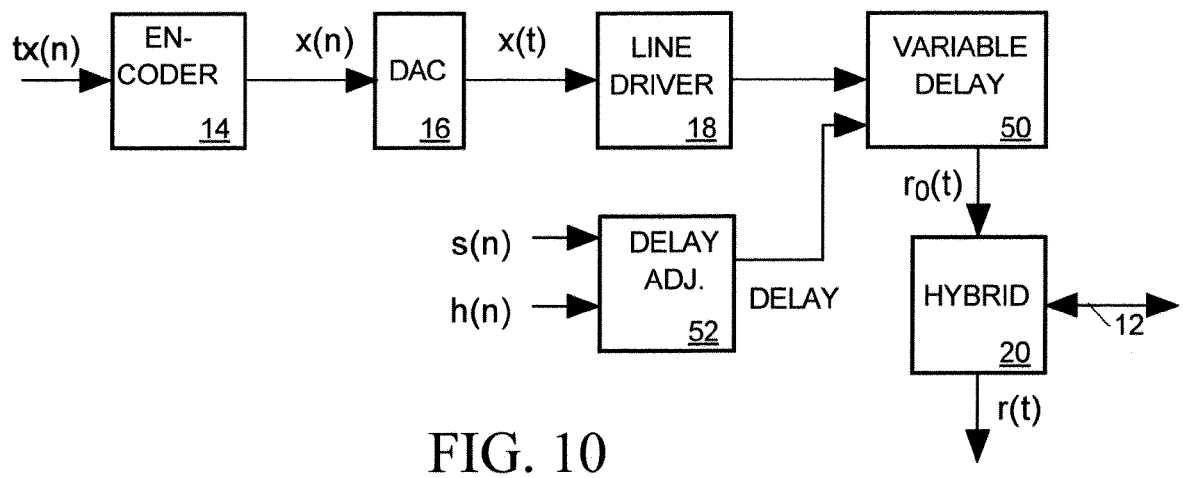
FIGS. 10-12 illustrate alternative implementations of a portion of the full-duplex transceiver of FIG. 4.
Figure 11:
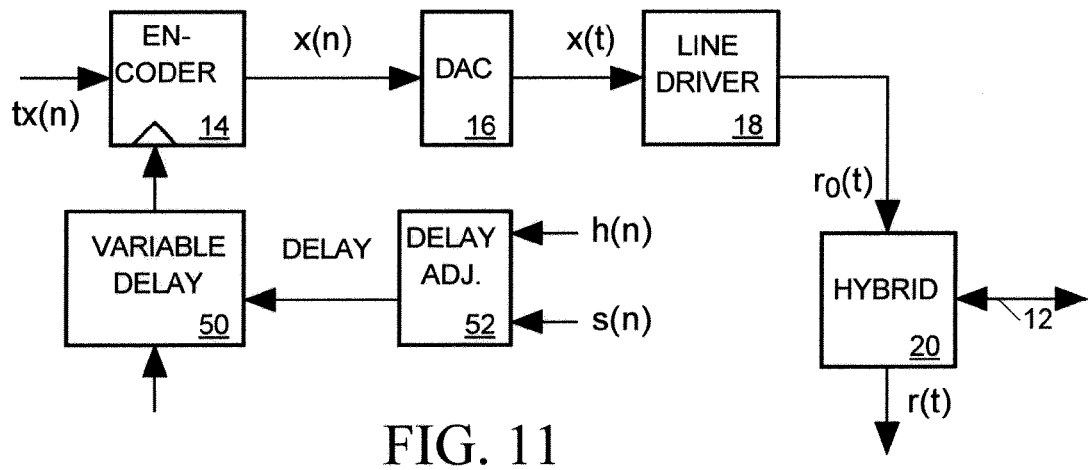
Figure 12:
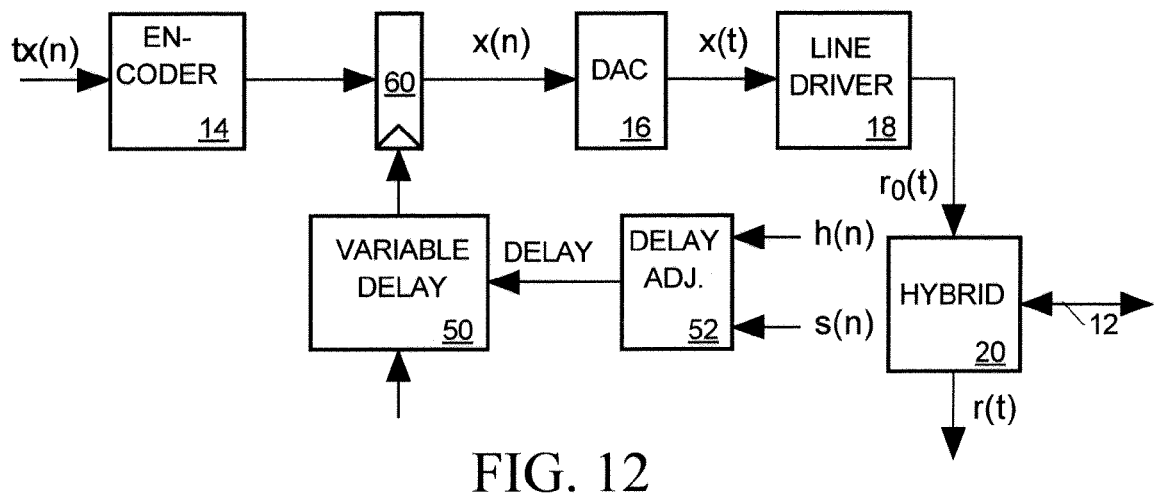

The foregoing specification and the drawings depict exemplary embodiments of the best modes of practicing the invention, and elements or steps of the depicted best modes exemplify the elements or steps of the invention as recited in the appended claims. However other modes of practicing the invention as recited in the claims are possible. For example, while the full duplex transceiver 48 of FIG. 4 employs a variable delay circuit 50 following DAC 16 to appropriately adjust phases of $r_2(t)$ and $z(t)$ (FIG. 2) relative to y(t) to reduce the effects of residual echo in soft and hard decision sequences s(n) and h(n), those of skill in the art will appreciate that it is possible to adjust the phases of $r_2(t)$ and z(t) relative to y(t) other than through a variable delay circuit 50 residing between DAC 16 and line driver 18. A similar result can be obtained by placing delay circuit 50 at the output of line driver 18 (FIG. 10) rather than at its input. It is also possible, as illustrated in FIG. 11 for variable delay circuit 50 to control the phases of $r_2(t)$ and z(t) relative to y(t) by adjusting timing of a clock signal controlling when encoder 14 transmits each successive value of x(n) to DAC 16 (FIG. 11) or by adjusting timing of a clock signal a register 60 between encoder 14 and DAC 16 of the prior art transceiver 10 of FIG. 1 (FIG. 12).

While the invention has been illustrated above as an improvement to a full-duplex transceiver having the architecture depicted in FIG. 1, those of skill in the art will appreciate that the invention may be employed as an improvement to any full-duplex transceiver architecture that produces soft and hard decision sequences in response to the digitized output of a hybrid circuit. Also it should be understood that FIG. 2 is only an example of one particular hybrid circuit architecture and that the invention may be practiced in connection with hybrid circuits having other architectures of the type employing a replica of the outgoing signal to cancel its echo in the received signal.

Figure 13:
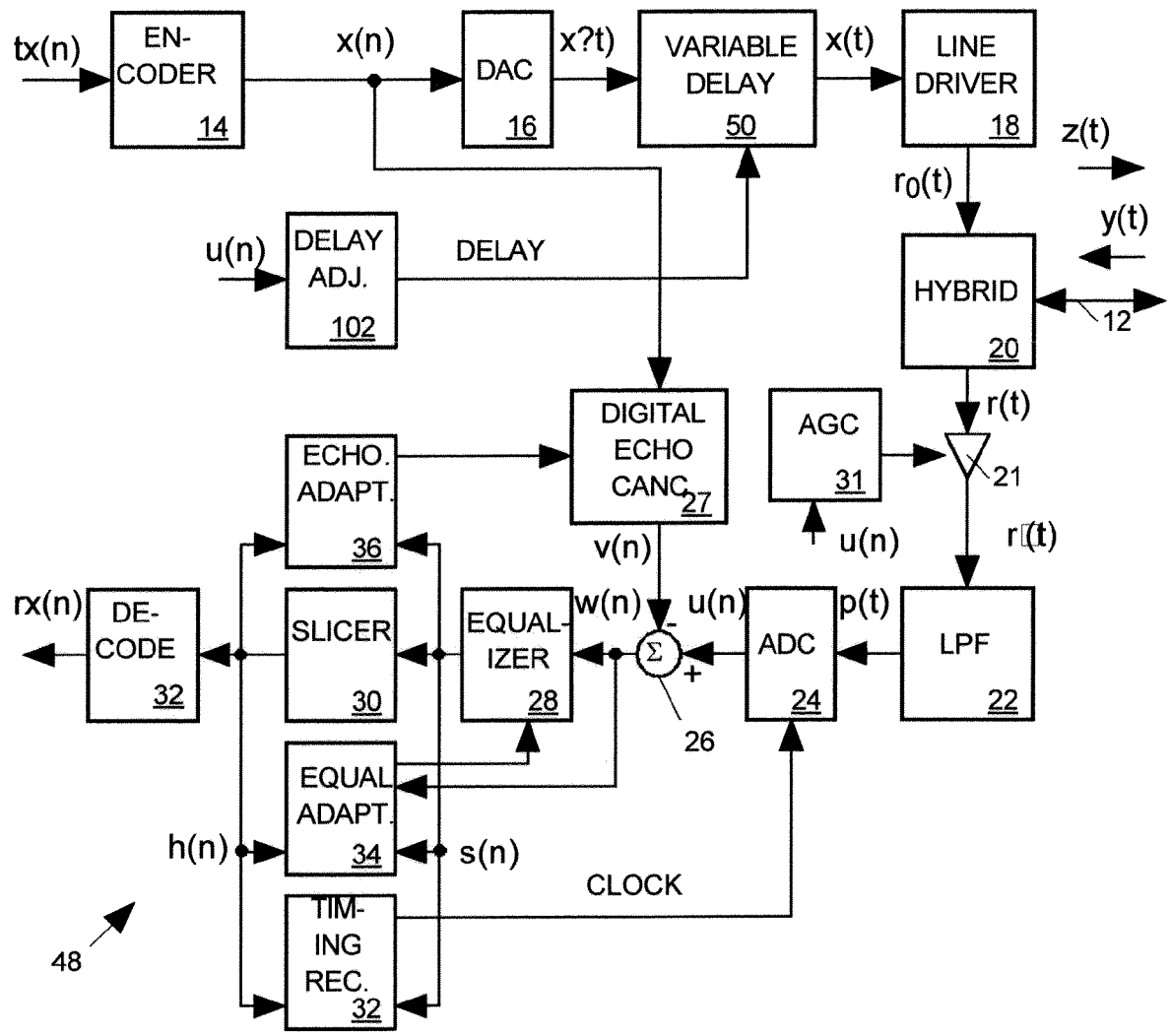
FIG. 13 depicts a full duplex transceiver in accordance with an alternative embodiment of the invention.

FIG. 13 is a block diagram of a full-duplex transceiver 100 in accordance with an alternative embodiment of the invention that is similar to transceiver 48 of FIG. 4 except that delay adjustment circuit 52 of FIG. 4 has been replaced with a delay adjustment circuit 102. While delay adjustment circuit 52 of FIG. 4 controls the delay of variable delay circuit 50 so to minimize a difference between corresponding elements of hard and soft decision sequences h(n) and s(n), delay adjustment circuit 102 controls the delay of variable delay circuit 50 so as to minimize the mean square value of u(n). Since any residual echo will cause the mean square value of u(n) to increase, delay adjustment circuit 102 minimizes the residual echo in u(n) when it sets the delay of variable delay circuit to minimize the mean square value of u(n). Delay adjustment circuit 102 can have substantially the same topology as delay adjustment circuit 52, as depicted in FIG. 7, except that when implementing delay adjustment circuit 104, filter 64 generates the mean square of u(n) rather than a mean square error such that the $MSE_1$ output of filter 64 is $$MSE_1 = (1/K)\sum_{n=1}^{K} u(n)^2$$

Those of skill in the art will appreciate that filter 64 may be adapted to generate other measures of the variation of the average value of u(n).

Since the invention is not limited to the exemplary embodiments of the invention described above, the appended claims are intended to be broadly interpreted to cover any mode of practicing the invention comprising the combination of elements or steps as described in any one of the claims, including elements or steps that are functional equivalents of the example elements or steps of the exemplary embodiment(s) of the invention depicted in the specification and drawings.

The invention claimed is:

1. A communication device comprising:
    a transmitter for receiving a first signal and for generating a second signal, wherein the second signal carries substantially the same information as the first signal but has a timing offset that is adjustable;
    a hybrid circuit for receiving the second signal and a third signal, and for generating a fourth signal and a fifth signal which is generated in response to the second signal and the third signal;
    a receiver for receiving the fifth signal and the first signal and for generating a sixth signal in response to the fifth signal and the first signal;
    a decision circuit for generating a multi-level decision in response to the sixth signal; and
    a controller circuit for adjusting the timing offset to reduce a difference between the multi-level decision and the sixth signal.

2. The device of claim 1, wherein the third signal is received from a remote communication device via a communication media.

3. The device of claim 2, wherein the fourth signal is delivered to the remote communication device via the communication media.

4. The device of claim 1, wherein the first signal is a multi-level signal.

5. The device of claim 1, wherein the multi-level decision is chosen among a plurality of levels to approximate the sixth signal.

6. The device of claim 1, wherein the receiver equalizes the fifth signal to compensate a distortion caused by a communication media.

7. The device of claim 1, wherein the receiver characterizes a correlation between the fifth signal and the first signal and removes a portion of the fifth signal that is correlated with the first signal.

8. The device of claim 1, wherein the controller circuit adjusts the timing offset according to a variation of an average value of the fifth signal.

9. The device of claim 1, wherein the controller circuit comprises a digital filter, a storage location, a comparing circuit, a state machine, and a counter.

10. The device of claim 1, wherein the controller circuit adjusts the timing offset according to the difference between the multi-level decision and the sixth signal.

11. The device of claim 10, wherein the controller circuit employs a measure of the difference between of the multi-level decision and the sixth signal to determine how to adjust the timing offset, and the measure is one of a mean square error (MSE), a sum of square error (SSE), a mean of absolute error (MAE), and a sum of absolute error (SAE).

12. A method of full-duplex communication, the method comprising:
   receiving a first signal and generating a second signal that is substantially proportional to the first signal but has a timing offset that is adjustable;
   receiving a third signal from a remote communication device via a communication media;
   generating a fourth signal in response to the second signal;
   delivering the fourth signal to the remote communication device via the communication media;
   generating a fifth signal in response to both the second signal and the third signal;
   processing the fifth signal and the first signal to generate a sixth signal in response to the fifth signal and the first signals;
   making a multi-level decision for the sixth signal to represent the sixth signal; and
   adjusting the timing offset to reduce a difference between the sixth signal and the multi-level decision.

13. The method of claim 12, wherein the processing step further comprises:
   equalizing the fifth signal to compensate a distortion caused by the communication media.

14. The method of claim 13, wherein the processing step further comprises:
   characterizing a correlation between the fifth signal and the first signal and removing a portion of the fifth signal that is correlated with the first signal.

15. The method of claim 12, wherein the processing step further comprises:
   characterizing a correlation between the fifth signal and the first signal and removing a portion of the fifth signal that is correlated with the first signal.

16. The method of claim 12, wherein the first signal is a multi-level signal.

17. The method of claim 12, wherein the timing offset is adjusted according to a variation of an average value of the fifth signal.

18. The method of claim 12, wherein the timing offset is adjusted according to the difference between the multi-level decision and the sixth signal.

19. The method of claim 12, wherein the step of adjusting comprises:
   employing a measure of the difference between of the multi-level decision and the sixth signal to determine how to adjust the timing offset;
   wherein the measure is one of a mean square error (MSE), a sum of square error (SSE), a mean of absolute error (MAE), and a sum of absolute error (SAE).

20. A communication device comprising:
   a transmitter to receive a first signal and to generate a second signal, wherein the second signal carries substantially the same information as the first signal but has a timing offset that is adjustable;
   a hybrid circuit to receive the second signal from the transmitter and a third signal from a remote communication device via a communication media, to generate a fourth signal which is delivered to the remote communication device via the communication media, and to generate a fifth signal in response to the second signal and the third signal;
   a receiver to receive the fifth signal and the first signal and to generate a sixth signal in response to the fifth signal and the first signal; and
   a delay adjustment circuit to determine how to adjust the timing offset to reduce a residual echo in the fifth signal.

21. The device of claim 20, wherein the delay adjustment circuit determines how to adjust the timing offset according to a variation of an average value of the fifth signal.

22. The device of claim 20, wherein the delay adjustment circuit determines how to adjust the timing offset according to a mean square of the fifth signal.

23. The device of claim 20, further comprising:
   a decision circuit to generate a multi-level decision in response to the sixth signal.

24. The device of claim 23, wherein the delay adjustment circuit determines how to adjust the timing offset according to a difference between the multi-level decision and the sixth signal.

* * * * *